US006763850B1

(12) United States Patent

Jansen et al.

(10) Patent No.: US 6,763,850 B1

(45) Date of Patent: Jul. 20, 2004

(54) THROTTLE CONTROL MECHANISM AND SENSOR MOUNTED ON A THROTTLE BODY

(75) Inventors: Gregory A. Jansen, Oshkosh, WI (US); David W. Kusche, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 199 days.

(21) Appl. No.: 10/134,853

(22) Filed: Apr. 29, 2002

(51) Int. Cl.[7] ................................................ F16K 37/00

(52) U.S. Cl. ....................... 137/554; 137/553; 251/263; 251/294

(58) Field of Search ................................ 137/553, 554; 251/251, 263, 294; 123/336, 337; 73/118.1, 118.2, 118

(56) References Cited

U.S. PATENT DOCUMENTS

| | | | | |
|---|---|---|---|---|
| 2,330,388 A | * | 9/1943 | Scott-Paine | 137/554 |
| 2,866,343 A | * | 12/1958 | Kovacs | 137/553 |
| 4,285,499 A | * | 8/1981 | Zukausky | 251/294 |
| 4,864,996 A | | 9/1989 | Hensel | 123/442 |
| 5,040,508 A | * | 8/1991 | Watanabe | 123/399 |
| 5,076,385 A | * | 12/1991 | Terazawa et al. | 123/399 |
| 5,154,206 A | * | 10/1992 | Gillott et al. | 137/554 |
| 5,273,016 A | | 12/1993 | Gillespie et al. | 123/403 |
| 5,704,334 A | | 1/1998 | Kato | 123/336 |
| 5,756,890 A | | 5/1998 | Fedison, Jr. | 73/118 |
| 5,967,861 A | | 10/1999 | Ozawa et al. | 440/1 |
| 6,019,083 A | | 2/2000 | Isogawa | 123/336 |
| 6,029,510 A | | 2/2000 | Nakaie et al. | 73/118 |
| 6,263,898 B1 | * | 7/2001 | Vanderveen et al. | 251/263 |
| 6,288,534 B1 | | 9/2001 | Starkweather et al. | 324/207 |
| 6,341,593 B2 | | 1/2002 | Kamimura et al. | 123/337 |

* cited by examiner

*Primary Examiner*—John Rivell

(74) *Attorney, Agent, or Firm*—William D. Lanyi

(57) ABSTRACT

A throttle plate control system mounts a rotational position sensor directly to a throttle body structure to take advantage of vibration isolation provided for the throttle body structure. The configuration is compact and connects the throttle plate of the throttle body structure in force transmitting relation with a rotational position sensor by using a cam structure. A cam member is coupled to a movable portion of a rotational position sensor and a cam follower is rigidly attached to the throttle plate shaft within the throttle body structure. By shaping the cam surface of the cam member, a nonlinear relationship can be specifically predetermined in order to maximize the operation of a throttle control system.

18 Claims, 6 Drawing Sheets

| THROTTLE SHAFT ROTATION | SENSOR ROTATION |
|---|---|
| 9.00 | 0.00 |
| 12.15 | 2.94 |
| 13.50 | 6.13 |
| 14.40 | 9.19 |
| 15.08 | 12.25 |
| 15.30 | 15.32 |
| 15.57 | 18.38 |
| 15.98 | 21.44 |
| 16.43 | 24.50 |
| 16.88 | 27.57 |
| 17.37 | 30.63 |
| 18.23 | 33.69 |
| 19.80 | 36.75 |
| 21.60 | 39.82 |
| 24.03 | 42.88 |
| 27.00 | 45.94 |
| 28.08 | 49.00 |
| 28.80 | 52.07 |
| 30.60 | 55.13 |
| 35.28 | 58.19 |
| 38.79 | 61.25 |
| 41.40 | 64.31 |
| 43.38 | 67.03 |
| 45.99 | 70.43 |
| 48.06 | 73.50 |
| 49.95 | 76.56 |
| 52.02 | 79.63 |
| 54.27 | 82.69 |
| 57.33 | 85.75 |
| 60.84 | 88.40 |
| 67.14 | 91.34 |
| 77.58 | 94.94 |
| 90.00 | 98.00 |

FIG. 6

THROTTLE CONTROL MECHANISM AND SENSOR MOUNTED ON A THROTTLE BODY

BACKGROUND OF THE INVENTION

1. Field of the Invention

The present invention relates generally to a throttle control mechanism and, more particularly, to a structure by which a rotational position sensor and a throttle control mechanism are directly mounted, for support, to a throttle body for purposes of vibration isolation and associated with each other in a force transmitting relationship which utilizes a cam structure.

2. Description of the Prior Art

Many different systems are well known to those skilled in the art for the purpose of controlling the movement of a throttle plate within a throttle body structure and monitoring the angular position of the throttle plate relative to the throttle body structure. Some systems of this type mount a rotational position sensor directly to the throttle body for the purpose of having the movable portion of the rotational position sensor rotate about the axis of rotation of the throttle plate. Other known systems mount a rotational position sensor at a region of an internal combustion engine away from the throttle body structure and connect the throttle plate axis to the rotational position sensor with a linkage arrangement so that the two components rotate about their respective axes in a coordinated manner.

U.S. Pat. No. 6,341,593, which issued to Kamimura et al on Jan. 29, 2002, describes a throttle apparatus for an engine. An electronic throttle apparatus permits aggregating of various parts and rationalization of installation, and can simplify assembling operation and wiring operation to an engine room for rationalization of an installation space. The throttle apparatus for an engine includes a throttle body housing therein a throttle valve and disposed in an air intake of the engine, a throttle actuating motor, a throttle position sensor detecting a throttle valve angle and an air flow sensor located upstream of the throttle valve and measuring an intake air flow rate. The throttle actuating motor, the throttle position sensor, and the air flow sensor are mounted on the throttle body.

U.S. Pat. No. 6,228,534, which issued to Starkweather et al on Sep. 11, 2001, describes a non-contacting throttle valve position sensor. The throttle valve position sensor has a non-contacting, magnetic field sensor coupled to or integral with a gear wheel of a geared throttle valve control. The sensor provides a more durable sensor. Sensor circuitry can be provided on the lid of the control, along with control motor electrical connections, so that the sensor and control motor can be connected by simple joining in a single operation. The throttle control valve is intended for internal combustion engines for motor vehicles.

U.S. Pat. No. 6,029,510, which issued to Nakaie et al on Feb. 29, 2000, describes a rotary throttle position sensor. The device is related to a rotary throttle position sensor for detecting the position of a throttle shaft of an internal combustion engine, and aims to increase the reliability in installation on a throttle shaft. The rotor prior to installation is provisionally retained in position to always ensure the initial point of rotation by making a protrusion provided on the rotor touch and ride over a protrusion provided on the cover, thereby the rotor is pressed to the case when the cover is assembled on the case.

U.S. Pat. No. 6,019,083, which issued to Isogawa on Feb. 1, 2000, describes a throttle and sensor arrangement for an engine. A throttle control system for an outboard motor and throttle position sensor therefore that permits a compact assembly by operating the throttle valve via an intermediate throttle valve operating shaft that is disposed closer to the body of the engine and farther from the protective cowling than the throttle valve. A throttle position sensor is associated with this intermediate throttle operating shaft for providing a signal indicative of throttle valve position for engine control.

U.S. Pat. No. 5,967,861, which issued to Ozawa et al on Oct. 19, 1999, describes a throttle position sensor mounting arrangement for a personal watercraft engine. The mounting arrangement for a throttle position sensor associated with a throttle valve is described. The throttle valve is positioned within an intake pipe of an intake system of an engine which is positioned in an engine compartment defined by a hull of a watercraft. An output shaft of the engine is arranged to drive a water propulsion device of the watercraft. The intake pipe extends from the engine and is arranged to route air to a combustion chamber of the engine. The throttle position sensor is mounted so as to be shielded by the intake pipe from a source of water within the engine compartment, such as an outlet of an intake duct leading through the hull of the watercraft.

U.S. Pat. 5,756,890, which issued to Fedison, Jr. on May 26, 1998, describes a snap mount throttle position sensor. A throttle body assembly is provided for use in the air intake system of an internal combustion engine. The throttle body assembly includes a plastic throttle body housing and a throttle position sensor mounted thereto. The housing and throttle position sensor each have a mounting flange with one flange telescopically insertable into a pocket in the other flange. A snap fit mechanism will securely hold the two mounting flanges together in the proper orientation.

U.S. Pat. No. 5,704,334, which issued to Kato on Jan. 6, 1998, describes an engine throttle sensor. The throttle sensor senses the position of an associated throttle shaft in order to determine the position of a corresponding throttle valve. The position of the throttle sensor is positioned in the engine to reduce the girth of the engine. In one embodiment, the throttle sensor lies to the side of a throttle linkage which interconnects a plurality of throttle valves. The throttle sensor and throttle linkage are arranged on a side of an intake manifold opposite a side on which fuel injectors of the engine are located. In another embodiment, the throttle sensor lies at an upper end of the intake manifold and is coupled to a common, vertically oriented throttle shaft that operates a plurality of throttle valves.

U.S. Pat. No. 5,273,016, which issued to Gillespie et al on Dec. 28, 1993, describes a throttle lever position sensor for a two stroke fuel injected engine. A marine propulsion device comprises a propulsion unit which is adapted to be mounted on a boat and which includes a propeller shaft and an internal combustion engine drivingly connected to the propeller shaft. The engine includes an engine block structure having a combustion chamber and defining an air intake passage communicable with the combustion chamber. A throttle plate is moveably supported by the engine block structure and located in the air intake passage, with the structure for moving the throttle plate in response to movement of an operator control member. The structure is supported by the engine block structure for providing a signal indicating the position of a control member independent of the position of the throttle plate.

U.S. Pat. No. 4,864,996, which issued to Hensel on Sep. 12, 1989, discloses a fuel injected two cycle engine with progressive throttle linkage for improved resolution of a throttle position sensor. A two cycle crankcase compression fuel injected internal combustion engine has a first set of one or more throttle valves controlling combustion air flowing into the crankcase and a second set of one or more throttle valves also controlling combustion air flowing into the crankcase. A throttle position sensor controls fuel injection according to throttle position. Increased resolution of sensed throttle position at low engine speed is provided by admitting combustion air only through the first set of throttle valves and not through the second set of throttle valves at low engine speed for an initial given range of motion, such that greater movement of the first set of throttle valves is required to obtain a given amount of combustion air flow for a given engine speed, prior to opening the second set of throttle valves, to provide more accurate fuel injection and better driveability. Progressive throttle linkage is movable to open the first set of throttle valves through a given range of motion prior to opening the second set of throttle valves.

The patents described above are hereby expressly incorporated by reference in in the description of the present invention.

Numerous conditions affect the operability of a throttle control mechanism which comprises a rotational position sensor. For the purpose of accuracy and avoiding deterioration, it is beneficial if the rotational position sensor is mounted in such a way that it is protected from severe vibrations that could be caused by the engine's operation. The method of connecting a rotational position sensor to a throttle valve can introduce excessive lost motion which, in itself, can introduce additional error in the signal provided by the rotational position sensor which is intended to be representative of the throttle plate position. The method and location of mounting a rotational position sensor with respect to a throttle plate also necessitates certain spatial requirements, particularly in restricted volumes such as those typically available in conjunction with engines used in outboard motors. Furthermore, the relationship between a rotational position sensor signal and the actual throttle plate position can benefit from more accuracy and resolution during certain portions of the throttle plate's rotation than during other portions of the throttle plate's rotation. More resolution allows an engine control unit (ECU) to more precisely control the position of the throttle plate during certain ranges of the operation of the engine.

It would therefore be significantly beneficial if a throttle control system could mount a rotational position sensor directly to a throttle body in such a way that it is not mounted directly for rotation about the axis of the throttle plate itself. It would also be beneficial if the throttle position sensor could be mounted to the throttle body structure in such a way as to take advantage of the vibration isolation components associated with the throttle body structure. In addition, is would significantly beneficial if the relationship between the rotation of the rotational position sensor and the rotation of the throttle plate could be calibrated so that they are not necessarily associated in a linear relationship with each other.

SUMMARY OF THE INVENTION

A throttle control mechanism, made in accordance with a preferred embodiment of the present invention, comprises a throttle body structure and a throttle plate that is rotatable about a throttle axis relative to the throttle body structure. It also comprises a rotational position sensor comprising a stationary portion and a movable portion which is rotatable about a sensor axis. The throttle plate and the movable portion of the rotational position sensor are associated in force transmitting association with each other, wherein rotation of the movable portion of the rotational position sensor about the sensor axis causes the throttle plate to rotate about the throttle axis. The sensor axis is displaced from the throttle axis.

A preferred embodiment of the present invention further comprises a cam member attached to the movable portion of the rotational position sensor. The cam member has a cam surface. It also comprises a cam follower attached to the throttle plate. The cam follower is disposed in contact with the cam surface. The cam surface is shaped to cause the throttle plate to rotate about the throttle axis in a non linear relationship to the movable portion of the rotational position sensor which rotates about the sensor axis. A throttle cable is connected in force transmitting association with the movable portion of the rotational position sensor to cause rotation of the movable portion of the rotational position sensor about the sensor axis in response to movement of the throttle cable. The stationary portion of the rotational position sensor is rigidly attached to the throttle body structure. The cam follower comprises a cam follower arm rotatably attached to the throttle body structure and a cam follower wheel which is rotatably attached to the cam follower arm for rotation about a wheel axis. The cam follower wheel is disposed be in rolling contact with the cam surface.

BRIEF DESCRIPTION OF THE DRAWINGS

The present invention will be more fully and completely understood from a reading of the description of the preferred embodiment in conjunction with the drawings, in which:

FIG. 6 is a numerical representation of the relationship between the rotation of the throttle plate and the rotation of the rotational position sensor.

DESCRIPTION OF THE PREFERRED EMBODIMENT

Figure 1:
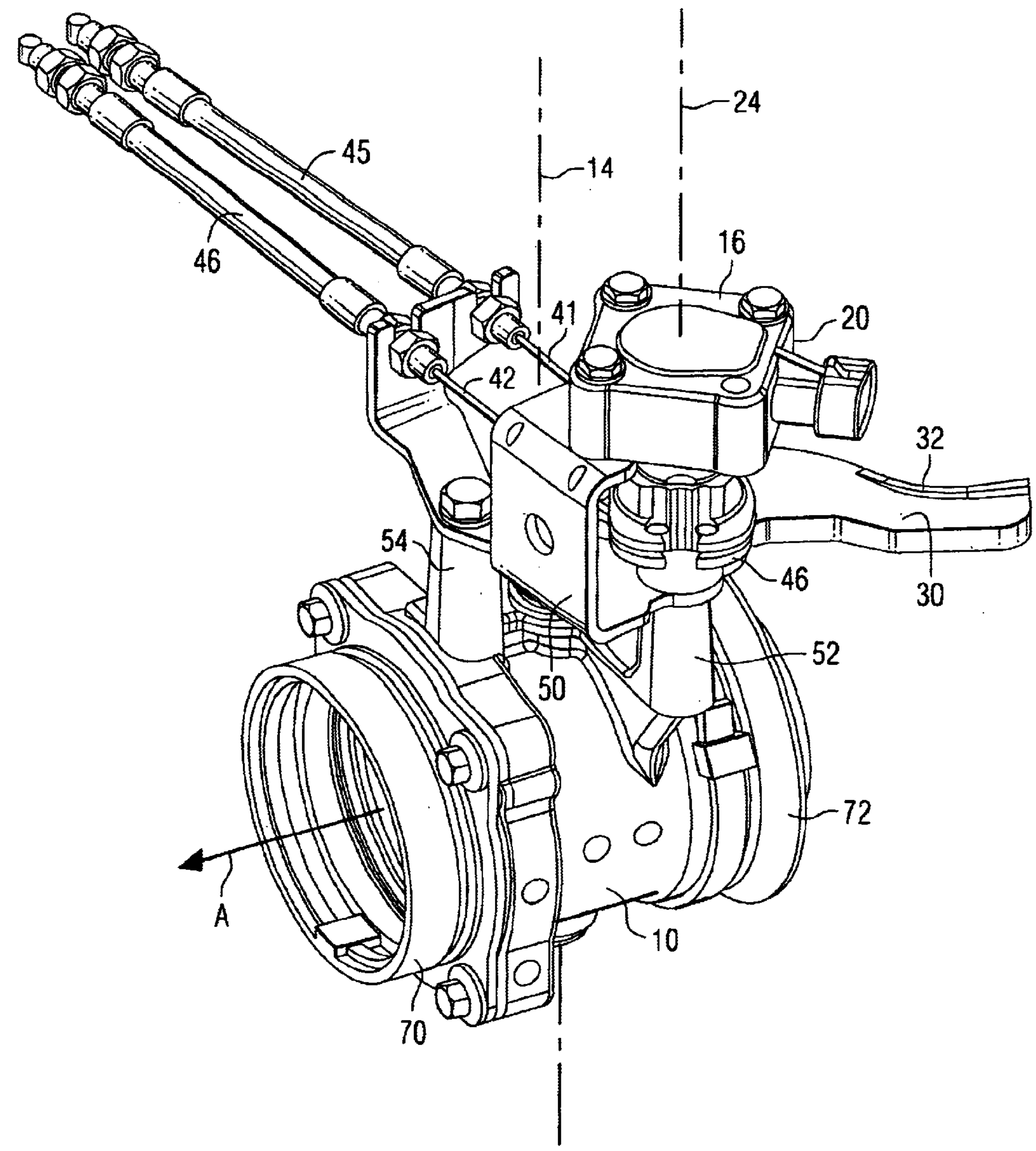
FIGS. 1 and 2 are isometric views of the present invention.

Throughout the description of the preferred embodiment of the present invention, like components will be identified by like reference numerals.

Figure 2:
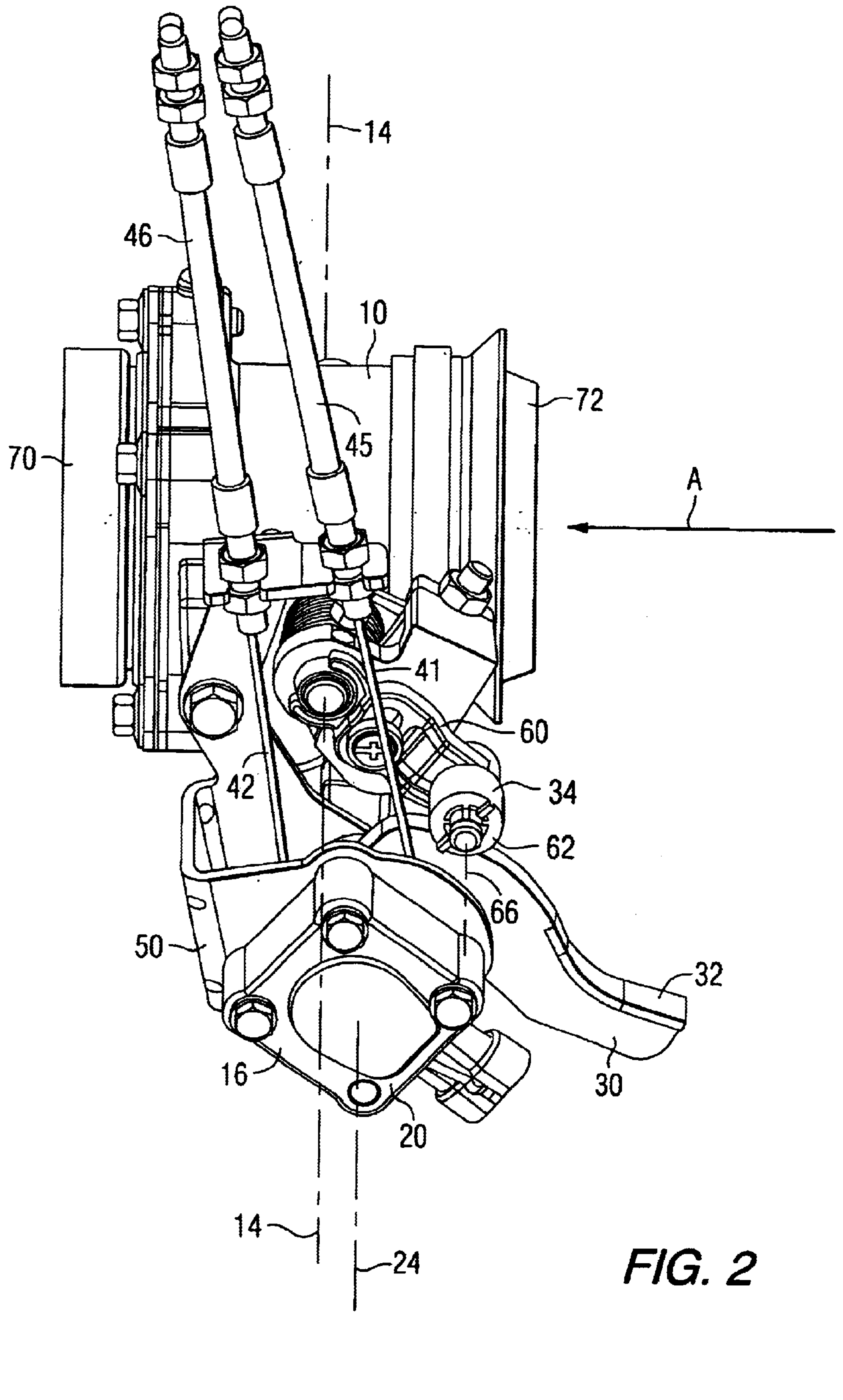

FIGS. 1 and 2 show two isometric views of a throttle body structure 10 and a throttle control mechanism made in accordance with the present invention. A throttle plate, which is not visible in FIGS. 1 and 2, is mounted for rotation about a throttle axis 14 relative to the throttle body structure 10. A rotational position sensor 16 comprises a stationary portion 20 and a movable portion which is located within the stationary portion 20, but is not visible in FIGS. 1 and 2. The throttle plate and the movable portion of the rotational position sensor 16 are associated in force transmitting association with each other in such a way that rotation of the movable portion of the rotational position sensor about the sensor axis 24 causes the throttle plate to rotate about the throttle axis 14. As can be seen in FIGS. 1 and 2, the sensor axis 24 and the throttle axis 14 are displaced from each other and are associated in a non coaxial relationship.

With continued reference to FIGS. 1 and 2, the force transmitting association between the rotational position sensor 16 and the throttle plate, in a preferred embodiment of the present invention, is provided by a cam member 30, which has a cam surface 32, and a cam follower 34 which is attached to the throttle plate, within the throttle body structure 10. The wheel 62 of the cam follower 34 is disposed in rolling contact with the cam surface 32, as illustrated in FIG. 2. The cam surface 32 is shaped to cause the throttle plate to rotate about the throttle axis 14 in a nonlinear relationship to the movable portion of the rotational position sensor 16 rotating about the sensor axis 24. Throttle cables, 41 and 42, are connected in force transmitting association with the movable portion of the rotational position sensor 16. More particularly, portion 46 of the cam member 30 is shaped to receive the throttle cables, 41 and 42, so that movement of the throttle cables within their respective sheaths, 45 and 46, causes the portion 46 of the cam member 30 to rotate about the center axis 24. Portion 46 of the cam member 30 is attached to the movable portion of the rotational position sensor 16, as will be described in greater detail below. Movement of the throttle cables, 41 and 42, within their respective sheaths, 45 and 46, causes the portion 46 of the cam member 30 to rotate about the sensor axis 24 and causes a change in the output signal provided by the rotational position sensor 16.

The stationary portion 20 of the rotational position sensor is rigidly attached to the throttle body structure 10. More specifically, it is attached to the support structure which comprises a bracket member 50 and support posts, 52 and 54. The cam follower 34 comprises a cam follower arm 60 that is rotatably attached to the throttle body structure 10 and also comprises the wheel 62 which is rotatably attached to the cam follower arm 60 for rotation about a wheel axis 66. The cam follower wheel 62 is disposed in rolling contact with the cam surface 32 of the cam member 30.

With continued reference to FIGS. 1 and 2, the throttle plate (which is identified by reference numeral 84 in FIG. 5 and will be discussed below) within the throttle body structure 10 is caused to rotate about the throttle axis 14 in response to the cam follower 34 being moved by its contact with the cam surface 32 of a moving cam member 30. The throttle cables, 41 and 42, cause the cam member 30 to rotate about the sensor axis 24 because of the attachment the cam member 30 and the movable portion of the rotational position sensor 16.

The throttle body structure 10, shown in FIGS. 1 and 2, is supported by elastomeric members, 70 and 72. These elastomeric members, 70 and 72, allow the throttle body structure 10 to be resiliently mounted to an air intake structure of the engine and to an air intake manifold, respectively, to isolate the throttle body structure 10 from vibrations emanating from the engine. By mounting the rotational position sensor 16 directly to the throttle body structure 10, the sensor 16 benefits from the vibration isolation provided by the elastomeric members 70 and 72.

Figure 3:
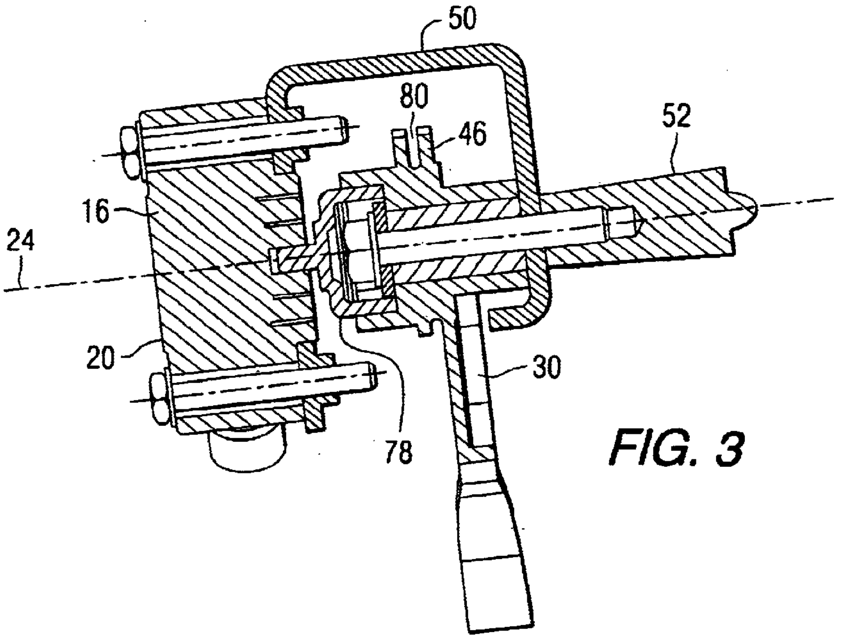
FIG. 3 is a section view through a portion of a rotational position sensor and cam member of the present invention.

FIG. 3 is a section view taken through the rotational position sensor 16, portion 46 of the cam member 30, and support post 52. Also shown in FIG. 3, is the support bracket 50. Although the internal structure of the rotational position sensor 16 is not specifically illustrated in FIG. 3, it should be understood that the movable portion of the rotational position sensor 16 is rotatable about the sensor axis 24 relative to the stationary portion 20 of the rotational position sensor 16. These rotational position sensors are well known and are commercially available. Many different types of rotational position sensors are known to those skilled in the art and can be used in conjunction with the present invention. The internal mechanism of the rotational position sensor 16 is not limiting to the present invention and can comprise a potentiometer structure, with a wiper associated with the movable portion and a resistive bridge structure associated with the stationary portion, or it can comprise a Hall-effect sensor that has a magnet attached to the movable portion of the sensor 16 and pole pieces associated with the stationary portion of the sensor. A floating coupler 78 allows the portion 46 to be attached to the movable portion of the sensor 16 for coordinated rotation about the sensor axis 24. Although not specifically visible in FIG. 3, the portion 46 of the cam member 30 is shaped to receive the throttle cables, 41 and 42, in a groove 80 formed within the portion 46.

Figure 4:
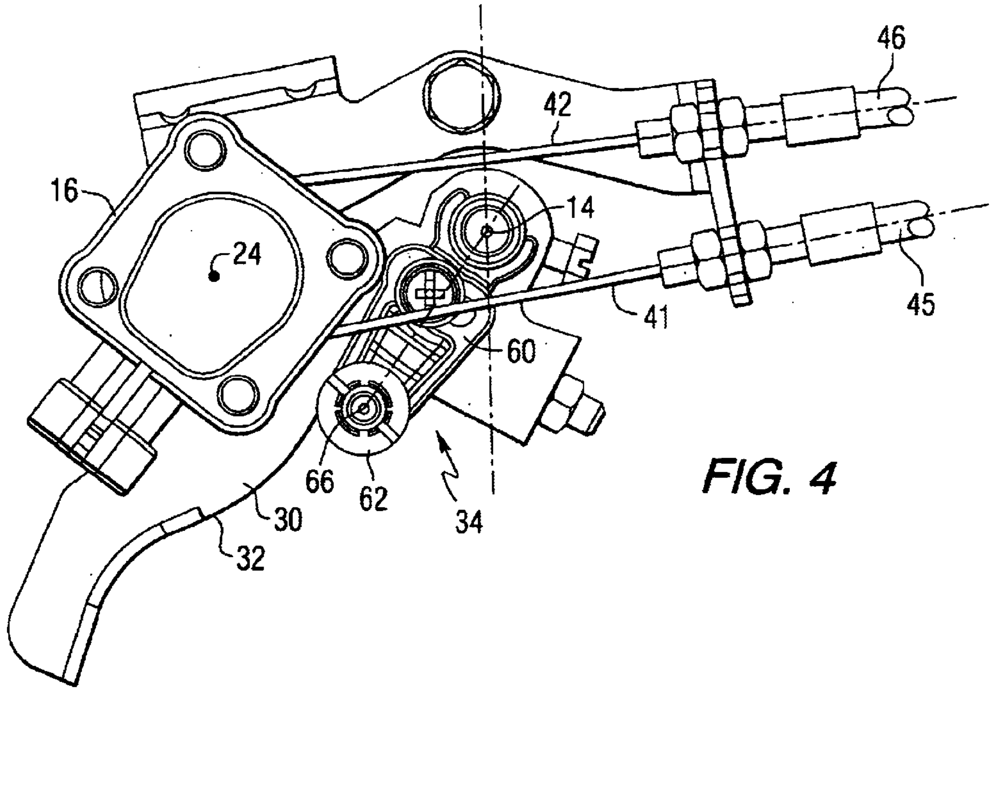
FIG. 4 is a side view of the mechanism of the present invention without the throttle body structure shown.

FIG. 4 shows the relationship between the sensor axis 24 and the throttle axis 14, which are displaced from each other in a preferred embodiment of the present invention. Movement of the throttle cables, 41 and 42, within their respective sheaths, 45 and 46, cause the portion 46 of the cam member 30 to rotate about the sensor axis 24 in coordinated movement with a movable portion of the rotational position sensor 16. The cam member 30 has a cam surface 32 against which a wheel 62 of a cam follower structure 34 is disposed in rolling contact. A cam follower arm 60 supports the wheel 62 for rotation about the cam follower wheel axis 66 and also allows the cam follower 34 to rotate about the throttle axis 14 in coordinated movement with the throttle plate.

Figure 5:
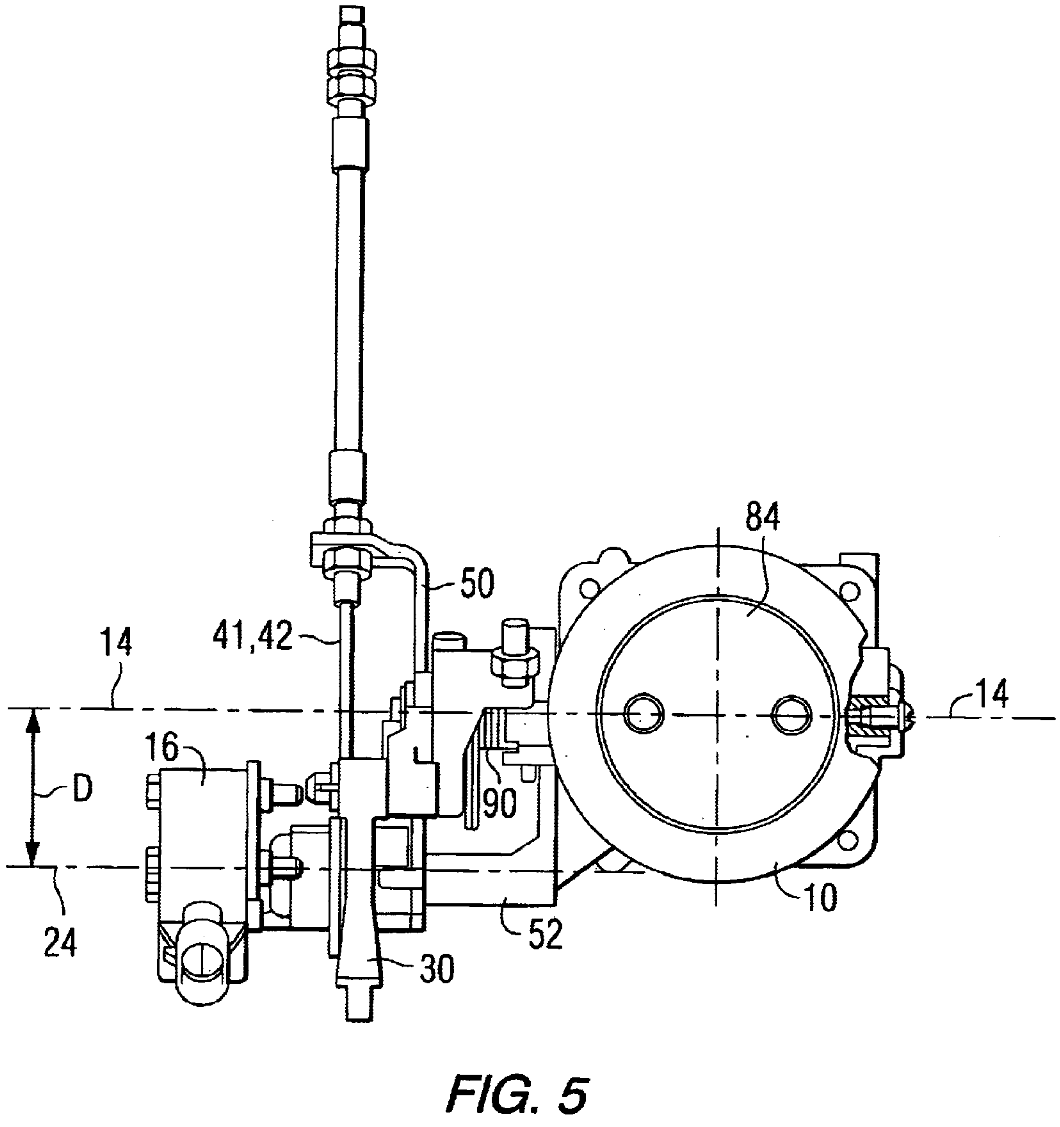
FIG. 5 is an end view of the present invention showing the throttle plate of the throttle body structure in comparison to the rotational position sensor and throttle cable system.

FIG. 5 is a view of the present invention which shows the throttle plate 84 disposed within the throttle body structure 10 for rotation about the throttle axis 14. FIG. 5 also shows the displacement, represented by arrow D, between the throttle axis 14 and the sensor axis 24. Other components are also identified by reference numerals in FIG. 5 for comparison to FIGS. 1–4.

With continued reference to FIG. 5, the present invention also comprises a spring 90 that is associated with the throttle plate 84 for the purpose of urging the throttle plate 84 toward an essentially closed position, as shown in FIG. 5, when the force on the throttle cables, 41 and 42, is relaxed. In other words, the spring 90 defines a home position for the throttle plate 84 which essentially closes the internal opening of the throttle body structure 10 and minimizes air flow therethrough.

FIG. 6 is a numerical representation of the nonlinear relationship between the rotation of the throttle shaft about the throttle axis 14 and the rotation of the rotational position sensor 16 about the sensor axis 24. The top entry in the table of FIG. 6 represents the positions of the throttle shaft and sensor 16 when tension on the throttle cables, 41 and 42, is relaxed and the spring 90 urges the throttle plate 84 to a home, or rest, position. In one embodiment of the present invention, this rest position is associated with a throttle shaft rotation of 9° about throttle axis 14 in order to slightly open the air passage past the throttle plate 84 and allow a minimal air flow through the internal cylindrical cavity of the throttle body structure 10. When the throttle plate is at this essentially closed position, the rotational position sensor 16 is at its maximum position of travel in its "closed" direction and provides an output signal of zero.

With continued reference to FIG. 6, the throttle plate 84 has a maximum open position of 90° of rotation about the throttle axis 14 relative to the throttle body structure 10. When the throttle plate 84 is in its most opened position of 90°, the rotational position sensor 16 provides a signal representative of 98° of rotation of the sensor relative to its starting position represented by the top row in FIG. 6. As can be seen, 81° of rotation of the throttle plate 84 is associated with 98° of rotation of the movable portion of the sensor 16. However, it can also be seen in FIG. 6 that the two columns are not linearly related to each other. The relationship between the rotation of the throttle plate 84 about its throttle axis 14 to the rotational position of the movable portion of the rotational position sensor 16 about its sensor axis 24 is determined by the shape of the cam surface 32 of the cam member 30. In a particularly preferred embodiment of the present invention, this relationship is numerically represented in FIG. 6 and graphically represented in FIG. 7.

Figure 7:
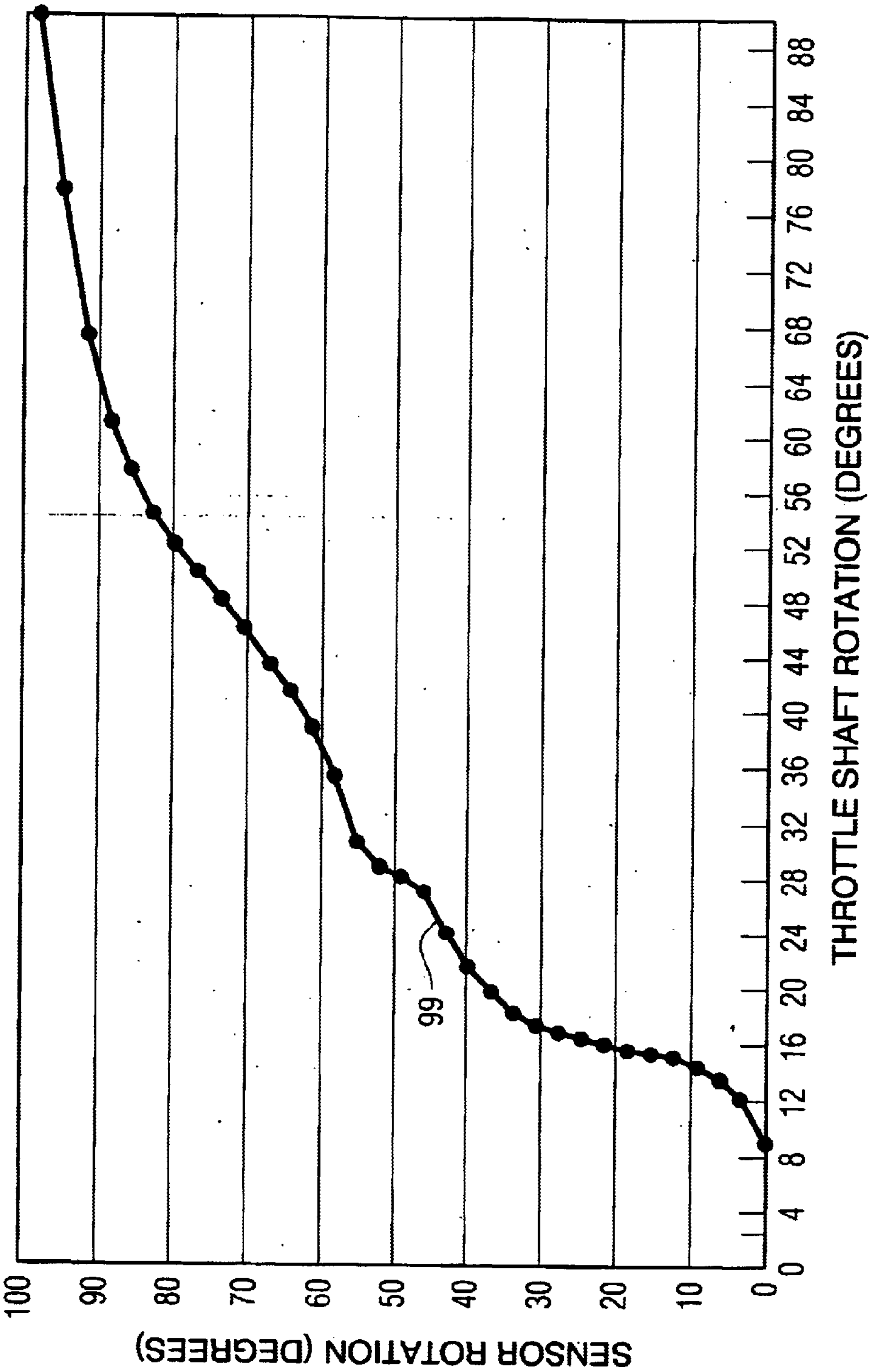
FIG. 7 is a graphical representation of the numerical table shown in FIG. 6.

FIG. 7 is a graphical representation of the positions of the movable portion of the rotational position sensor 16 relative to the position of the throttle shaft which is attached to the throttle plate 84. Although not shown in the figures, it should be understood that the throttle shaft is attached to the throttle plate 84 and aligned along the throttle axis 14 to support the throttle shaft 84 within the internal cylindrical opening of the throttle body structure 10. In FIG. 7, it can be seen that the relationship between the throttle plate 84 rotation about the throttle axis 14 and the rotation of the movable portion of the rotational position sensor 16 about the sensor axis 24 are clearly not linear. This provides a significant advantage for an engine control module (ECM) that is used to control the operating speed of an engine. In FIG. 7, it can be seen that the sensitivity of the rotational position sensor 16 is much higher when the throttle shaft is between approximately 14° and 18° than during other portions of the throttle shaft's rotation. In other words, a very slight movement of the throttle shaft in that range causes a significant change in the position of the movable portion of the rotational position sensor 16. This provides a significantly enhanced resolution of the output signal provided by the rotational position sensor 16 to an engine control module. The slope of curve 99 clearly shows that the sensitivity of the rotational position sensor 16 changes dramatically as a function of the throttle plate position because of the preselected shape of the cam surface 32 of the cam member 30.

With reference to FIGS. 1–7, a particularly preferred embodiment of the present invention comprises a throttle body structure 10 and a throttle plate 84 which is attached to a throttle plate shaft supported by the throttle body structure 10 for rotation about a throttle axis 14 relative to the throttle body structure 10. The throttle plate 84 is rigidly attached to the throttle plate shaft for rotation with the throttle plate shaft about the throttle axis 14 relative to the throttle body structure 10. A rotational position sensor 16 is supported by the throttle body structure 10. The rotational position sensor comprises a stationary portion 20 and a movable portion. The movable portion is rotatable about a sensor axis 24 relative to the stationary portion 20. The sensor axis 24 is displaced from the throttle axis 14. A cam member 30 is coupled, by the floating coupler 78, to the movable portion of the rotational position sensor 16 and also to the throttle plate shaft which is rigidly attached to the throttle plate 84. This causes the throttle plate shaft to rotate about the throttle axis 14 in response to the movable portion of the rotational position sensor rotating about the sensor axis 24. The cam structure comprises a cam member 30 and a cam follower 34. The cam member 30 is coupled to the movable portion of the rotational position sensor 16 and supported by the throttle body structure for rotation about the sensor axis 24. The cam member 30 has a cam surface 32. The cam follower is rotatable about a cam follower axis, or wheel axis 66, and is disposed in rolling contact with the cam surface 32. The cam follower axis 66 is displaced from the throttle plate axis 14 and is rotatable about the throttle plate axis. A cam follower arm 60 is supported by the throttle body structure 10 for rotation about the throttle axis 14. The cam follower wheel 62 is supported by the cam follower arm 60 for rotation about the cam follower axis 66. The cam follower wheel is rotatable relative to the cam follower arm 60 and about wheel axis 66. A throttle cable, 41 and 42, is connected in force transmitting association with the movable portion of the rotational position sensor 16 to cause rotation of the movable portion of the rotational position sensor 16 about the sensor axis 24 in response to movement of the throttle cable, 41 and 42, about their respective sheaths, 45 and 46. As a result, the rotational position sensor 16 is mounted to the throttle body structure 10 to take advantage of the vibration isolation provided to the throttle body by the use of elastomeric members, 70 and 72. This isolates the rotational position sensor from vibrations caused by the engine. In addition, the structure provided by the present invention is compact and does not require linkage members to link the rotational position sensor to the throttle plate 84. In addition, the use of a cam surface 32 in conjunction with a cam follower 34 allows the resolution of the rotational position sensor 16 to be determined to suit the best advantage of the control system. By shaping the cam surface 32 in a predetermined manner, any one of a wide range of nonlinear relationships can be provided between the relative rotations of the rotational position sensor's movable portion and the throttle plate 84.

Although the throttle plate 84 and the throttle plate shaft have been consistently described as individual components which are attached together, it should be understood that the throttle plate 84 could be designed with diametrically opposed tab extensions which are insertable into diametrically opposed holes within the internal cavity of the throttle body structure 10. As a result, no continuous throttle plate shaft would exist. However, it should be understood that, if such a composite structure is used, the term "throttle plate shaft" shall be interpreted as defined the effective support structure that supports the throttle plate 84 for rotation within the throttle body structure 10. In such a case, the supporting structure of the throttle plate 84 and any other associated components shall be included within the definition of the term "throttle plate shaft". Although a most common application of the present invention is intended for a device in which a throttle plate 84 is rigidly attached to an individual throttle plate shaft which, in turn, is rotatable within the throttle body structure 10 and which supports the throttle plate 84, alternative support structures that support the throttle plate 84 within the throttle body 10 for rotation shall be considered to be within the definition of "throttle plate shaft."

Although the present invention has been described in particular detail and illustrated to show a preferred embodiment, it should be understood that alternative embodiments are also within its scope.

We claim:

1. A throttle control mechanism, comprising:

a throttle body structure;

a throttle plate rotatable about a throttle axis relative to said throttle body structure;

a rotational position sensor comprising a stationary portion and a movable portion which is rotatable about a sensor axis, said throttle plate and said movable portion of said rotational position sensor being associated in force transmitting association with each other, wherein rotation of said movable portion of said rotational position sensor about said sensor axis causes said throttle plate to rotate about said throttle axis, said sensor axis being displaced from said throttle axis; and a throttle cable connected in force transmitting association with said movable portion of said rotational position sensor to cause rotation of said movable portion of said rotational position sensor about said sensor axis in response to movement of said throttle cable.

2. The mechanism of claim 1, further comprising:

a cam member coupled to said movable portion of said rotational position sensor, said cam member having a cam surface; and a cam follower attached to said throttle plate, said cam follower being disposed in contact with said cam surface.

3. The mechanism of claim 2, wherein:

said cam surface is shaped to cause said throttle plate to rotate about said throttle axis in a nonlinear relationship to said movable portion of said rotational position sensor rotating about said sensor axis.

4. The mechanism of claim 1, wherein:

said stationary portion of said rotational position sensor is rigidly attached to said throttle body structure.

5. The mechanism of claim 2, wherein:

said cam follower comprises a cam follower arm rotatably attached to said throttle body structure and a wheel rotatably attached to said cam follower arm for rotation about a wheel axis.

6. The mechanism of claim 2, wherein:

said cam follower comprises a wheel disposed in rolling contact with said cam surface.

7. A throttle control mechanism, comprising:

a throttle body structure;

a throttle plate shaft supported by said throttle body structure for rotation about a throttle axis relative to said throttle body structure;

a throttle plate rigidly attached to said throttle plate shaft for rotation with said throttle plate shaft about said throttle axis relative to said throttle body structure;

a rotational position sensor supported by said throttle body structure, said rotational position sensor comprising a stationary portion and a movable portion, said movable portion being rotatable about a sensor axis relative to said stationary portion, said sensor axis being displaced from said throttle axis;

a cam structure coupled to said movable portion of said rotational position sensor and to said throttle plate shaft to cause said throttle plate shaft to rotate about said throttle axis in response to said movable portion rotating about said sensor axis; and a throttle cable connected in force transmitting association with said movable portion of said rotational position sensor to cause rotation of said movable portion of said rotational position sensor about said sensor axis in response to movement of said throttle cable.

8. The mechanism of claim 7, wherein:

said cam structure comprises a cam member and a cam follower, said cam member being coupled to said movable portion of said rotational position sensor and supported by said throttle body section for rotation about said sensor axis, said cam member having a cam surface, said cam follower being rotatable about a cam follower axis and disposed in contact with said cam surface, said cam follower axis being displaced from said throttle plate axis and rotatable about said throttle plate axis.

9. The mechanism of claim 8, further comprising:

a cam follower arm supported by said throttle body structure for rotation about said throttle axis.

10. The mechanism of claim 9, wherein:

said cam follower is rotatable relative to said cam follower arm.

11. The mechanism of claim 9, wherein:

said cam follower is supported by said cam follower arm for rotation about said cam follower axis.

12. The mechanism of claim 8, further comprising:

a return spring supported by said throttle body structure for urging said cam follower toward a first position.

13. The mechanism of claim 12, wherein:

said first position is associated with a maximum available closure position of said throttle plate within said throttle body structure.

14. The mechanism of claim 8, wherein:

said cam follower is rotatable on said cam surface.

15. The mechanism of claim 8, wherein:

said cam surface is shaped to cause said throttle plate to rotate about said throttle axis in a nonlinear relationship to the rotation of said movable portion of said rotational position sensor about said sensor axis.

16. The mechanism of claim 8, wherein:

rotation of said movable portion of said rotational position sensor causes said throttle plate to rotate about said throttle axis as a result of said cam follower being moved about said cam follower axis by said cam surface.

17. The mechanism of claim 7, wherein:

said throttle cable is attached to said cam member.

18. A throttle control mechanism, comprising:

a throttle body structure;

a throttle plate shaft supported by said throttle body structure for rotation about a throttle axis relative to said throttle body structure;

a throttle plate rigidly attached to said throttle plate shaft for rotation with said throttle plate shaft about said throttle axis relative to said throttle body structure;

a rotational position sensor supported by said throttle body structure, said rotational position sensor comprising a stationary portion and a movable portion, said movable portion being rotatable about a sensor axis relative to said stationary portion, said sensor axis being displaced from said throttle axis;

a cam structure coupled to said movable portion of said rotational position sensor and to said throttle plate shaft to cause said throttle plate shaft to rotate about said throttle axis in response to said movable portion rotating about said sensor axis, said cam structure comprising a cam member and a cam follower, said cam member being coupled to said movable portion of said rotational position sensor and supported by said throttle body structure for rotation about said sensor axis, said cam member having a cam surface, said cam follower being rotatable about a cam follower axis and disposed in contact with said cam surface, said cam follower axis being displaced from said throttle plate axis and rotatable about said throttle plate axis;

a cam follower arm supported by said throttle body structure for rotation about said throttle axis, said cam follower being supported by said cam follower arm for rotation about said cam follower axis, said cam follower being rotatable relative to said cam follower arm; and a throttle cable connected in force transmitting association with said movable portion of said rotational position sensor to cause rotation of said movable portion of said rotational position sensor about said sensor axis in response to movement of said throttle cable.

* * * * *